US006532075B1

(12) United States Patent
Edwards et al.

(10) Patent No.: US 6,532,075 B1
(45) Date of Patent: Mar. 11, 2003

(54) SYSTEM AND METHOD FOR UTILIZING A TOPOLOGY DETECTOR TO CAPTURE VISUAL INFORMATION

(75) Inventors: Eric D. Edwards, San Francisco, CA (US); Steven G. Goldstein, Los Angeles, CA (US); David G. Longendyke, Vernon, NJ (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/659,725

(22) Filed: Sep. 11, 2000

Related U.S. Application Data

(60) Provisional application No. 60/187,136, filed on Mar. 6, 2000.

(51) Int. Cl.[7] ................................................ G01B 11/24
(52) U.S. Cl. ...................... 356/609; 356/614; 356/622; 359/750.08; 359/750.01; 348/231; 348/220; 714/22; 714/24
(58) Field of Search ................................. 356/614, 609, 356/622, 237.3, 237.4, 124.5; 348/231, 249, 522, 699, 372, 88; 714/22, 24; 359/750.08, 750.01, 181

(56) References Cited

U.S. PATENT DOCUMENTS

| 4,844,617 A | 7/1989 | Kelderman et al. ......... 356/372 |
|---|---|---|
| 5,033,856 A | 7/1991 | Nose et al. .................. 356/376 |
| 5,477,264 A | * 12/1995 | Sarbadhikari et al. ....... 438/231 |
| 5,691,773 A | * 11/1997 | Wang et al. ................. 348/249 |
| 5,790,878 A | * 8/1998 | Anderson et al. ........... 348/372 |
| 5,847,753 A | * 12/1998 | Gabello et al. ............... 348/88 |
| 5,959,726 A | * 9/1999 | Riley et al. ............... 356/124.5 |
| 6,011,627 A | 1/2000 | Mulligan et al. ........... 356/375 |
| 6,094,221 A | * 7/2000 | Andersion ................... 348/231 |
| 6,263,453 B1 | * 7/2001 | Anderson ..................... 714/22 |

* cited by examiner

Primary Examiner—Richard A. Rosenberger
Assistant Examiner—Sang H. Nguyen
(74) Attorney, Agent, or Firm—Gregory J. Koerner; Simon & Koerner LLP

(57) ABSTRACT

A system and method for utilizing a topology detector to capture visual information comprises a topology detector that propagates a detection pulse towards a target object using a transmitter module, and then senses wave segments of the detection pulse with a sensor array as the wave segments are reflected back toward the topology detector. The topology detector may then generate contour values that correspond to localized areas of the target object. A detection manager may then access the contour values to responsively generate and store topology values that may be mapped to respective pixel values of a set of captured image data that represents the target object.

43 Claims, 8 Drawing Sheets

Sensor Array, 516

SYSTEM AND METHOD FOR UTILIZING A TOPOLOGY DETECTOR TO CAPTURE VISUAL INFORMATION

This application claims the benefit of provisional application No. 60/187,136, filed Mar. 6, 2000.

BACKGROUND SECTION

1. Field of the Invention

This invention relates generally to techniques for capturing visual information, and relates more particularly to a system and method for utilizing a topology detector to capture visual information.

2. Description of the Background Art

Implementing effective methods for capturing visual information is a significant consideration for designers and manufacturers of contemporary electronic devices. However, effectively capturing visual information by utilizing electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures, processes, and displays digital image data may benefit from an efficient implementation because of the large amount and complexity of the digital data involved.

In certain applications, three-dimensional visual information is being generated and utilized by system users of contemporary electronic devices. Such three-dimensional visual images are typically created by utilizing the laws of perspective to create a more realistic visual image of a given object or scene. For example, the three-dimensional images may be effectively utilized in environments where the target objects are in motion to thereby produce a more realistic visual effect.

Due to growing demands on system resources and substantially increasing data magnitudes, it is apparent that developing new techniques for capturing visual information is a matter of concern for related electronic technologies. Therefore, for all the foregoing reasons, developing effective systems for capturing visual information remains a significant consideration for designers, manufacturers, and users of contemporary electronic devices.

SUMMARY

In accordance with the present invention, a system and method are disclosed for utilizing a topology detector to capture topology information that relates to simultaneously captured visual information. Initially, in one embodiment, a system user preferably utilizes a viewfinder device to position and adjust a camera device for capturing image data that corresponds to a selected target object.

The system user then may preferably activate the topology detector using any effective technique. In one embodiment, the system user may activate the topology detector by partially depressing a shutter activation mechanism mounted to the external surface of the camera device. In certain other embodiments, the camera device may alternately be automatically positioned and the topology detector may be automatically activated through the use of appropriate electronic and mechanical means.

Next, a transmitter module from the topology detector preferably propagates a detection pulse towards the selected target object. The propagated detection pulse may comprise any appropriate type of energy transmission or waveform. For example, the foregoing detection pulse may include infrared energy, radio-frequency or microwave energy, and various types of sound or light energy.

Next, a sensor array from the topology detector preferably detects a plurality of localized wave segments from detection pulse as the localized wave segments are reflected back from the target object along respective scan paths towards the topology detector. The topology detector may responsively then generate individual contour values that each correspond to a respective reflected wave segment and scan path.

A detection manager may then preferably access the individual contour values generated by the topology detector to responsively generate corresponding topology values that accurately define the shape of the particular target object. Finally, a central processing unit in the camera device, in response to instructions from the detection manager, may preferably store the generated topology values into a memory device for subsequent utilization by any interested entity, such as a three-dimensional simulation software program. The present invention thus provides an improved system and method for utilizing a topology detector to capture visual information.

DETAILED DESCRIPTION

The present invention relates to an improvement in visual information capture techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for utilizing a topology detector to capture visual information, and preferably includes a topology detector that may propagate a detection pulse towards a target object using a transmitter module. The topology detector may then sense wave segments of the detection pulse with a sensor array, as the wave segments are reflected back toward the topology detector. The topology detector may then generate individual contour values that correspond to localized areas of the target object. A detection manager may then access the contour values to responsively generate and store individual topology values that may be mapped to respective pixel values from a set of captured image data that represents the target object.

Figure 1:
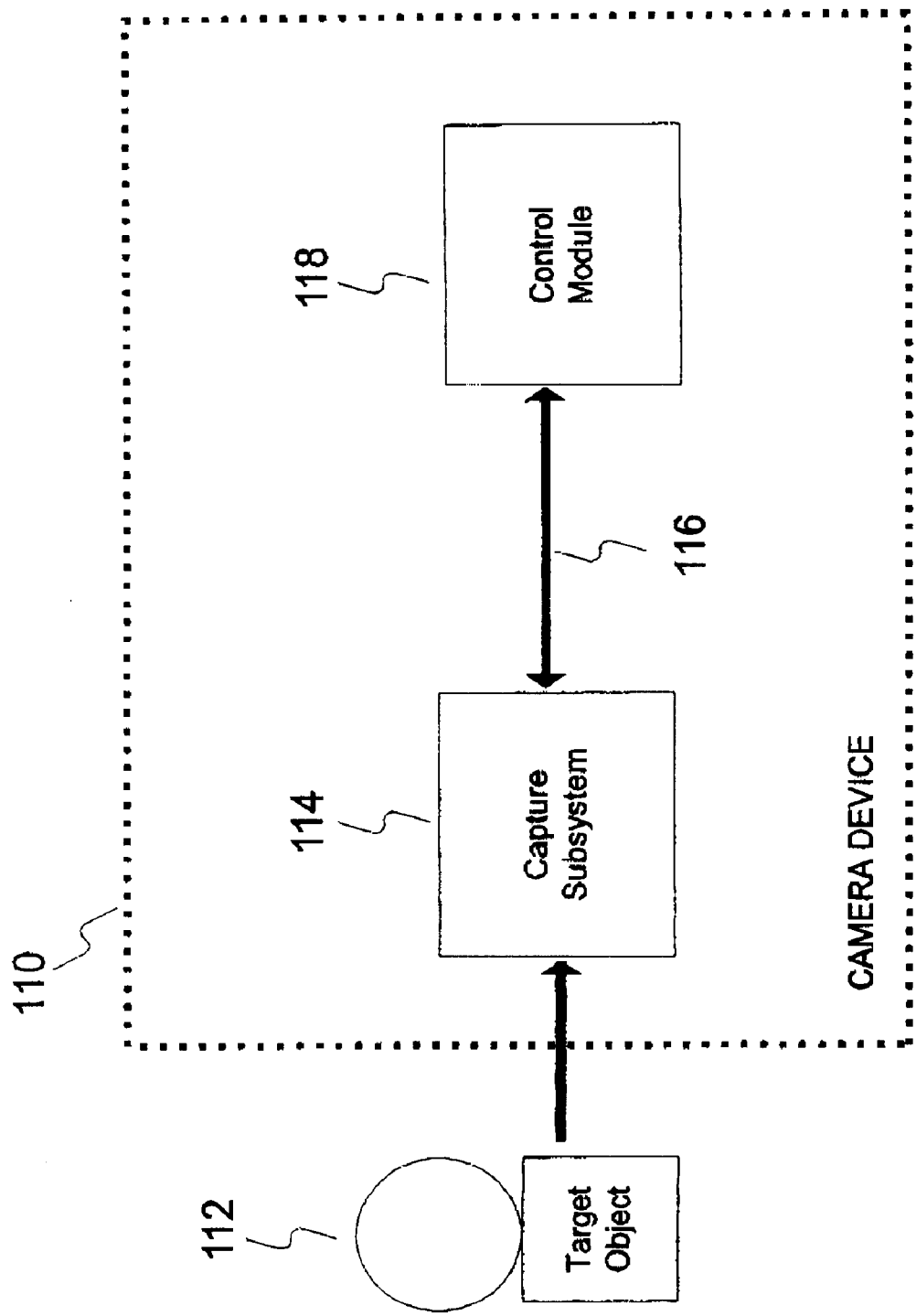
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. Capture subsystem 114 may be optically coupled to a target object 112, and may also be electrically coupled via system bus 116 to control module 118. In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
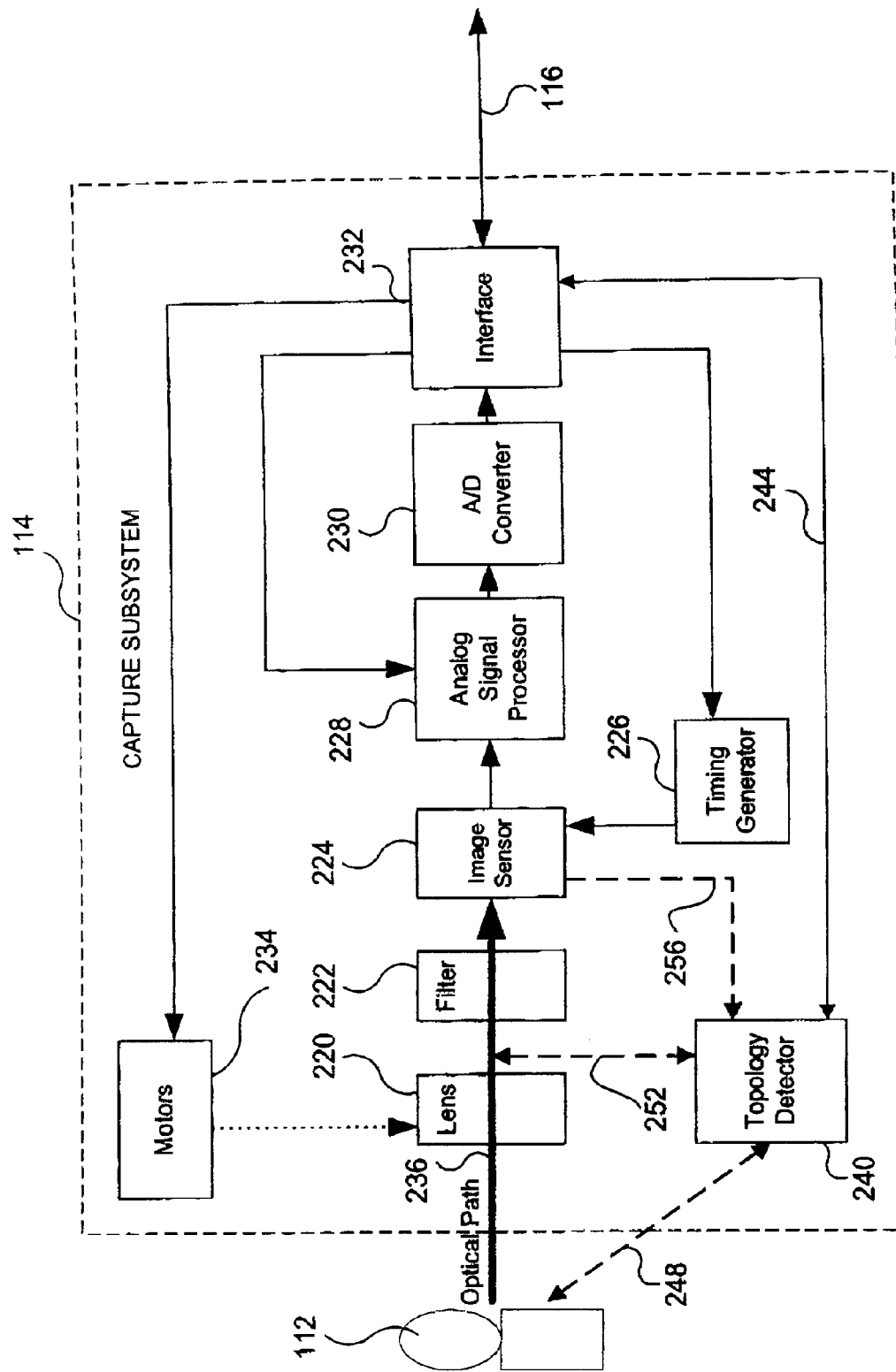
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises a lens 220 having an iris (not shown), a filter 222, an image sensor 224, a timing generator 226, an analog signal processor (ASP) 228, an analog-to-digital (A/D) converter 230, an interface 232, one or more motors 234 to adjust the focus of lens 220, and a topology detector 240. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which is preferably a charged-coupled device (CCD), may responsively generate a set of image data representing the target object 112. The image data may then be routed through ASP 228, A/D converter 230, and interface 232. Interface 232 may preferably include separate interfaces for controlling ASP 228, motors 234, timing generator 226, and topology detector 240. From interface 232, the image data passes over system bus 116 to control module 118.

In the FIG. 2 embodiment, topology detector 240 may preferably include any appropriate means for detecting and capturing information regarding the topology, contours, and specific three-dimensional shape of a particular target object 112. In the FIG. 2 embodiment, topology detector 240 may capture topology information using any effective methodology. For example, in certain embodiments, topology detector 240 may analyze target object 112 by directly scanning target object 112 along a direct scan path 248 that, in certain embodiments, may closely approximate optical path 236.

In alternate embodiments, topology detector 240 may analyze target object 112 by indirectly scanning target object 112 along an indirect scan path 252 that may be merged into optical path 236 using any appropriate means including a reflector device (not shown). In addition, topology detector 240 may also access relevant information such as image contrast information from image sensor 224 via path 256 to utilize in generating topology information for a particular target object 112. The functionality and configuration of topology detector 240 is further discussed below in conjunction with FIGS. 3 through 8.

Figure 3:
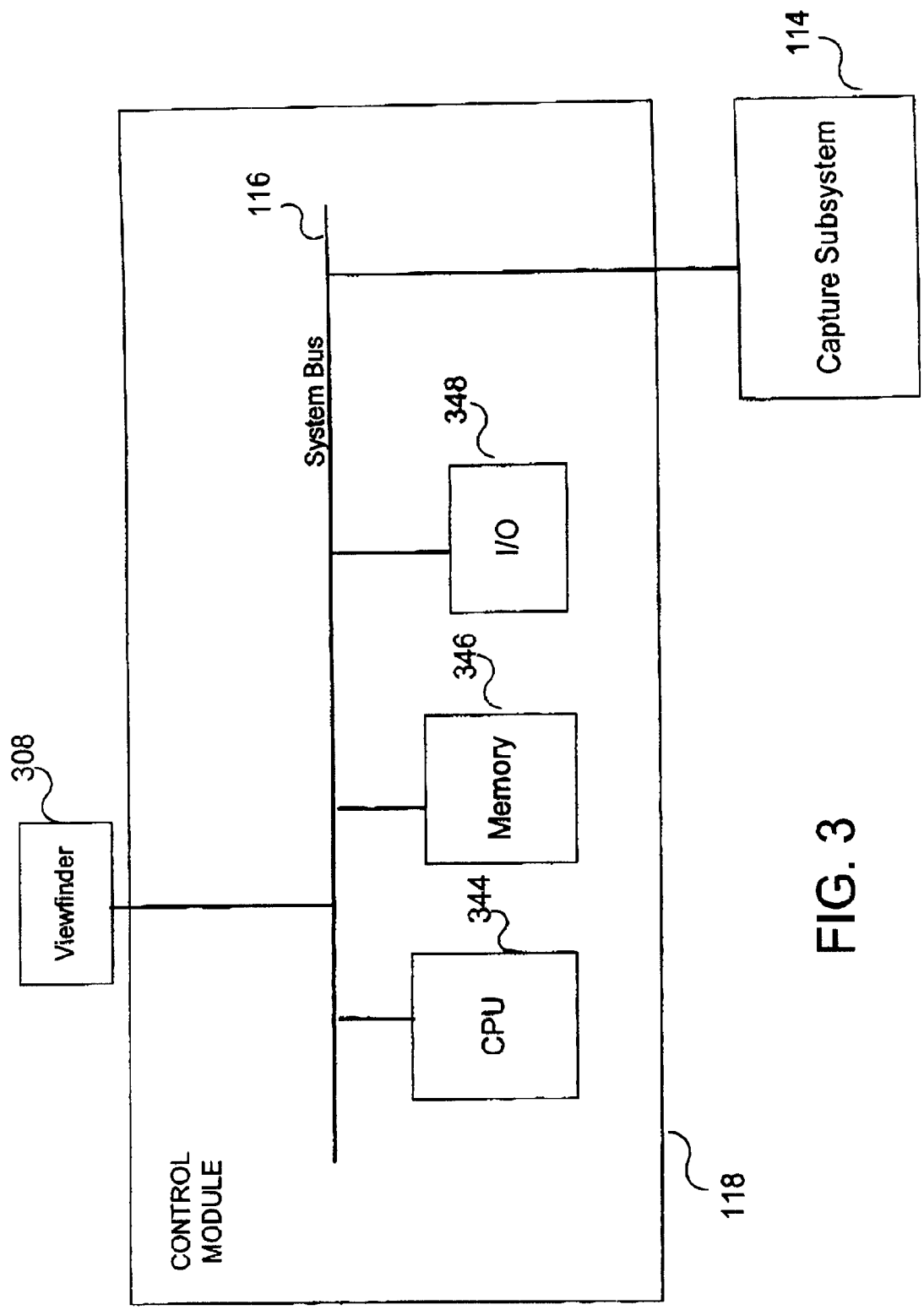
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and an input/output interface (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 8.

Figure 4:
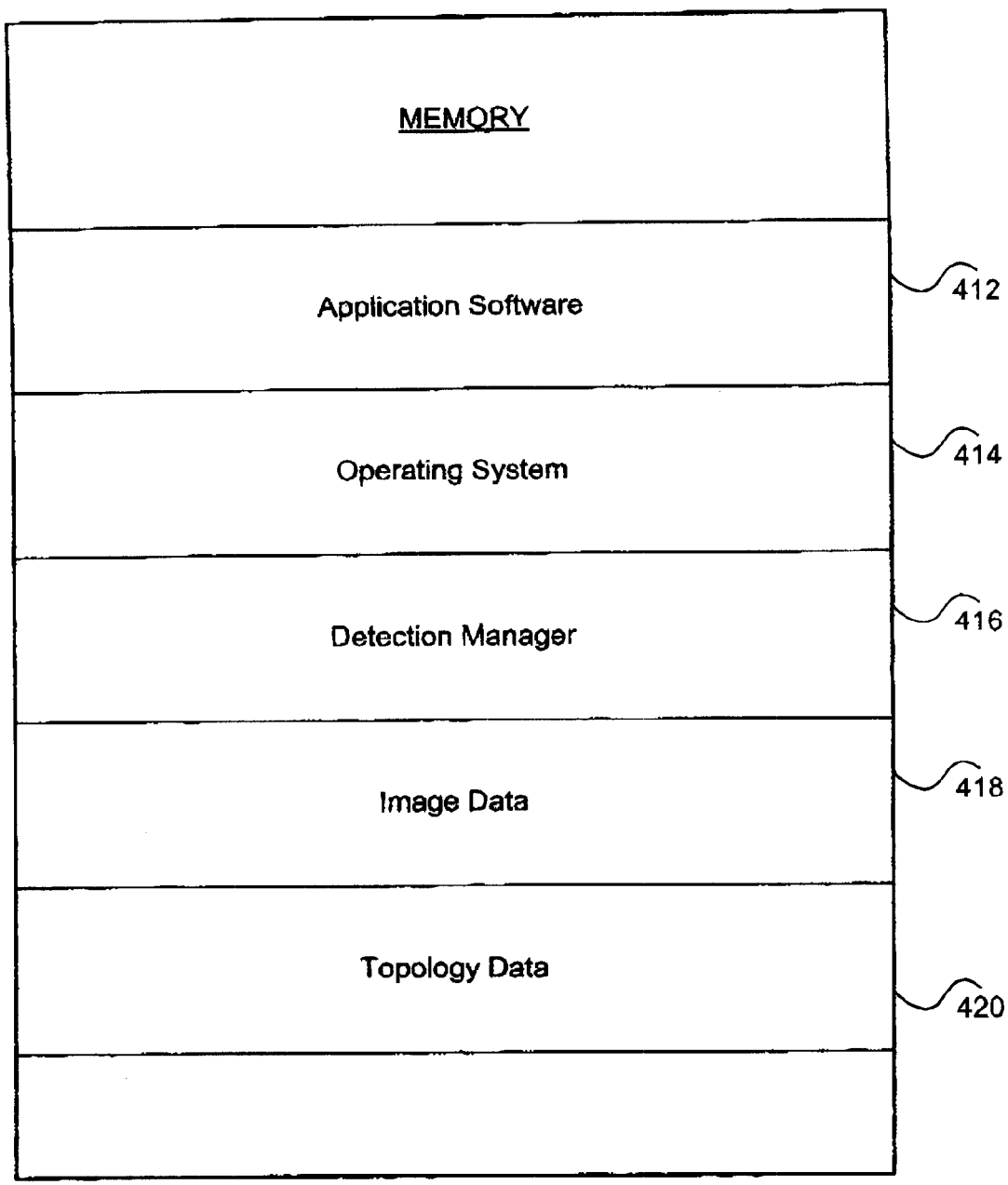
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 preferably includes, but is not limited to, application software 412, an operating system 414, a detection manager 416, image data 418, and topology data 420. In alternate embodiments, memory 346 may readily include various other components in addition to, or instead of, those components discussed in conjunction with the FIG. 4 embodiment.

In the FIG. 4 embodiment, application software 412 may include software instructions that are preferably executed by CPU 344 (FIG. 3) to perform various functions and operations for camera device 110. The particular nature and functionality of application software 412 preferably varies depending upon factors such as the specific type and particular use of the corresponding camera device 110.

In the FIG. 4 embodiment, operating system 414 preferably controls and coordinates low-level functionality of camera device 110. In accordance with the present invention, detection manager 416 preferably may control and coordinate the functionality of topology detector 240 to capture and store appropriate topology information for a selected target object 112.

In the FIG. 4 embodiment, image data 418 may preferably include individual sets of image data that are each captured using capture subsystem 114 and responsively provided to control module 118, as discussed above in conjunction with FIG. 2. In accordance with the present invention, topology data 420 may include discrete sets of topology information that each correspond to an associated set of image data in memory 346.

In certain embodiments, topology data 420 may include individual topology pixel values that are each mapped to a respective corresponding individual image pixel value in an associated set of image data by using any appropriate means including pointer or tag mechanisms. The operation of detection manager 416 in capturing and generating topology data 420 using topology detector 240 is further discussed below in conjunction with FIGS. 5 through 8.

Figure 5:
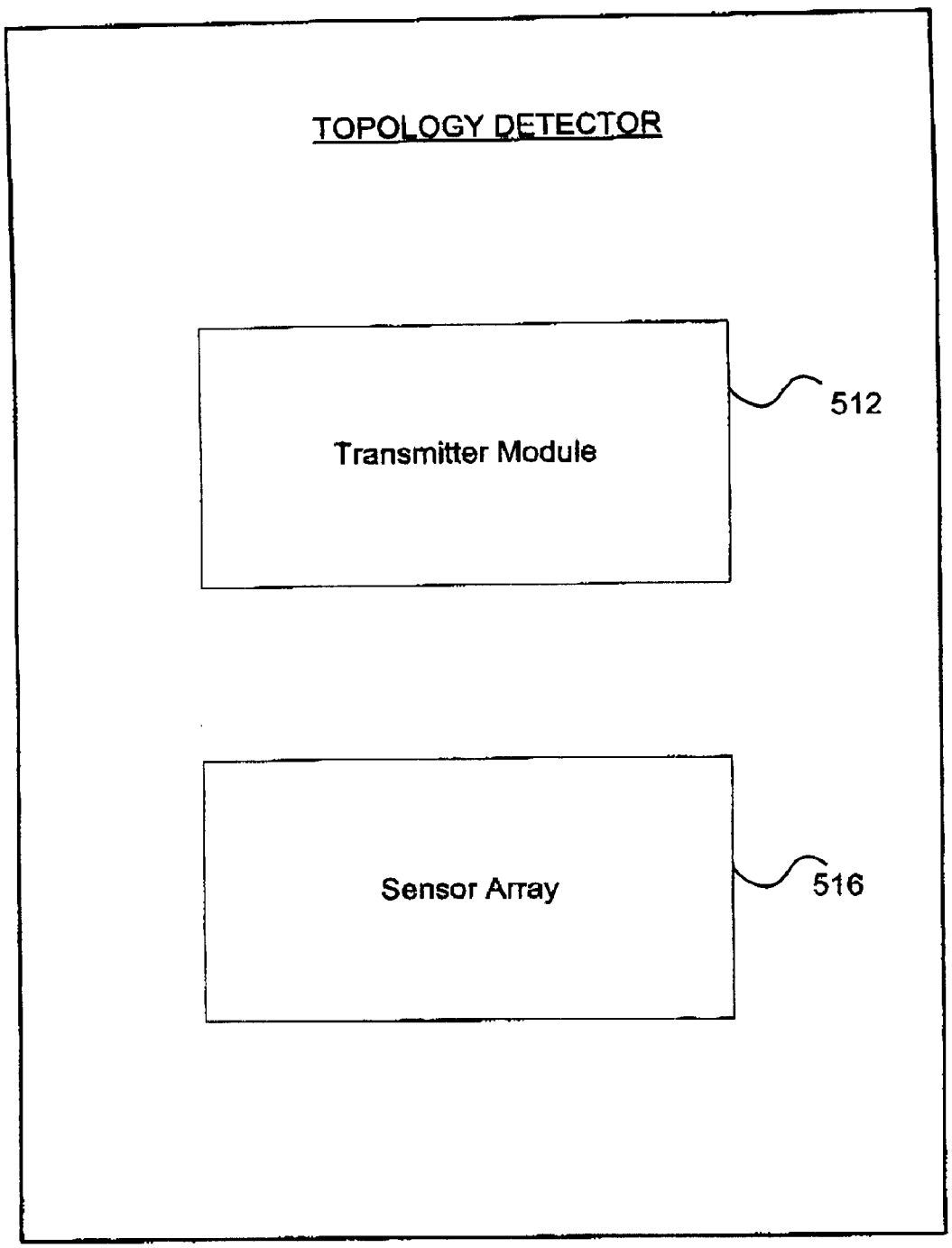
FIG. 5 is a block diagram for one embodiment of the topology detector of FIG. 2, in accordance with the present invention.

Referring now to FIG. 5, a block diagram for one embodiment of the FIG. 2 topology detector 240 is shown, in accordance with the present invention. In the FIG. 5 embodiment, topology detector 240 preferably includes, but is not limited to, a transmitter module 512 and a sensor array 516. In alternate embodiments, topology detector 240 may readily include various other components and functions in addition to, or instead of, those components and functions discussed in conjunction with the FIG. 5 embodiment. For example, in certain embodiments, in addition to the teachings of the present invention, transmitter module. 512 and sensor array 516 of topology detector 240 may also be economically utilized to function as an auto-focus mechanism for camera device 110.

In the FIG. 5 embodiment, topology detector 240 may preferably utilize transmitter module 512 to propagate a detection pulse towards a particular target object 112. In the FIG. 5 embodiment, the propagated detection pulse may comprise any appropriate type of energy transmission or waveform. For example, the foregoing detection pulse may include infrared energy, radiofrequency or microwave energy, and various types of sound or light energy. As discussed above in conjunction with FIG. 2, transmitter module 512 may utilize any effective transmission path or transmission technique to cause the propagated detection pulse to strike a selected target object 112 and be reflected back towards topology detector 240.

In the FIG. 5 embodiment, sensor array 516 may preferably be positioned to accurately sense discrete wave segments of the reflected deflection pulse as the detection pulse returns from target object 112. Sensor array 516 may then responsively detect the various localized wave segments from the reflected detection pulse to thereby generate a plurality of localized contour values. The contour values preferably each represent a specific length of time that a corresponding wave segment of the detection pulse requires to travel to and from a particular portion of the target object 112. Alternately, the contour values may each represent a specific scan path length between topology detector 240 and a particular localized area of target object 112. The foregoing contour values may utilize the topology detector (or any other suitable point) as a reference.

The foregoing contour values may then be converted into specific topology values that may advantageously be utilized by three-dimensional simulation software to create vector-based and other types of three-dimensional images corresponding to target object 112. In one embodiment, the three-dimensional simulation software preferably maps each topology value to a corresponding pixel of image data that was simultaneously captured by camera device 110. In certain embodiments, the present invention may thus be utilized to create three-dimensional images for use in applications such as three-dimensional computer games, video programs, computer graphics, holograms, or three-dimensional printing devices.

Figure 6:
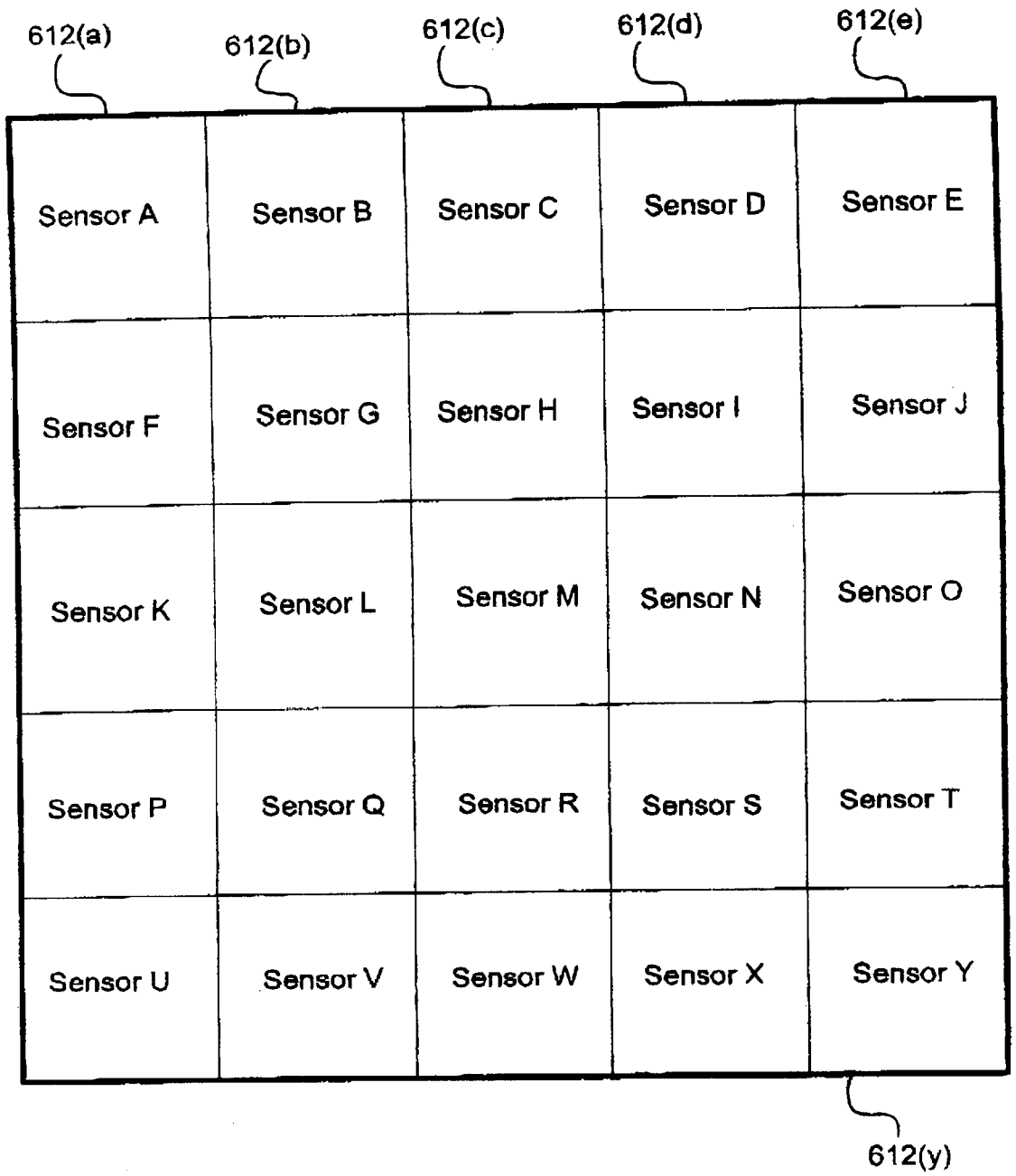
FIG. 6 is a block diagram for one embodiment of the sensor array of FIG. 5, in accordance with the present invention.

Referring now to FIG. 6, a block diagram for one embodiment of the FIG. 5 sensor array 516 is shown, in accordance with the present invention. In the FIG. 6 embodiment, sensor array 516 comprises a five-by-five matrix of individual sensors that preferably includes, but is not limited to, a sensor A 612(*a*) through a sensor Y 612(*y*). In alternate embodiments, sensor array 516 may readily include various other components in addition to, or instead of, those components discussed in conjunction with the FIG. 6 embodiment.

In addition, sensor array 516 may be implemented using any desired configuration. For example, sensor array 516 may include any desired number of sensors 612 that are arranged in any desired horizontal and vertical configuration.

In the FIG. 6 embodiment, each of sensors 612 may preferably utilize any appropriate methodology to sense a corresponding wave segment from a reflected detection pulse that impinges upon a surface of a corresponding sensor 512. Sensors 612 then may each preferably generate a corresponding contour value that is preferably based upon a detection-pulse travel time that extends from the propagation of the detection pulse by transmitter module 512 until the sensing of the reflected detection pulse by a corresponding localized sensor 612 in sensor array 516. The functionality of sensor array 516 is further discussed below in conjunction with FIGS. 7 and 8.

Figure 7:
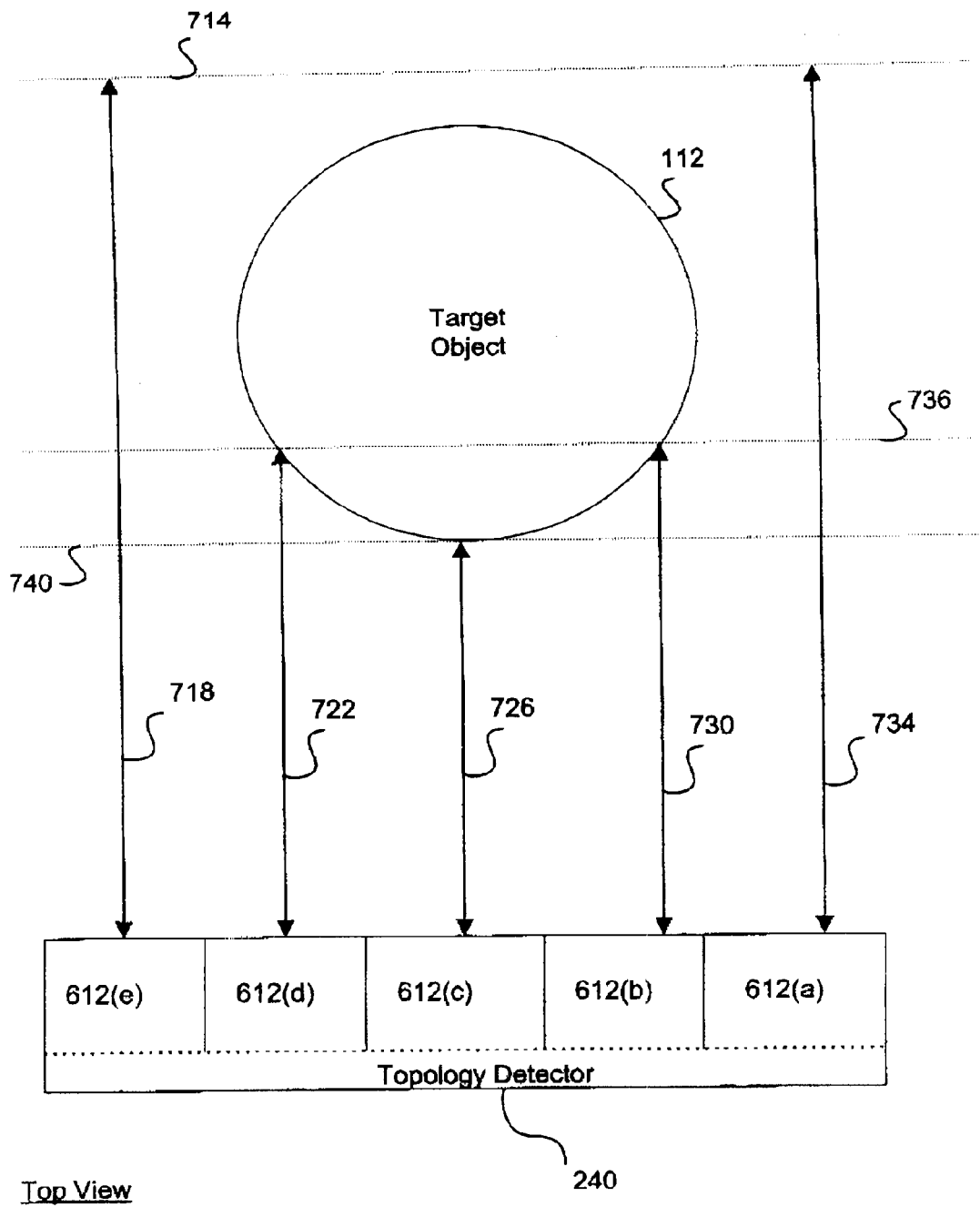
FIG. 7 is a top view diagram of a technique for utilizing a topology detector to capture visual information, in accordance with one embodiment of the present invention.

Referring now to FIG. 7, a top-view diagram of a technique for utilizing topology detector 240 is shown, in accordance with one embodiment of the present invention. In alternate embodiments, topology detector 240 may readily be utilized in various other ways in addition to, or instead of, that discussed in the FIG. 7 embodiment. For example, for purposes of clarity, the FIG. 7 topology detector 240 is implemented with a single horizontal sensor row of five sensors 612(*a*) through 612(*e*). However, in alternate embodiments, topology detector 240 may be configured to include any number of horizontal sensor rows that may include any desired number of individual sensors.

In the FIG. 7 embodiment, a transmitter module 512 (not shown) may preferably propagate a detection pulse towards target object 112, as discussed above in conjunction with FIG. 5. The detection pulse is then preferably reflected back towards topology detector 240. In practice, individual wave segments of the propagated detection pulse are separately reflected off localized objects that are preferably within the field of view of topology detector 240. In certain embodiments, the field of view of topology detector 240 preferably corresponds to the field of view of viewfinder 308 at the instant that transmitter module 512 propagates the detection pulse towards target object 112.

Each wave segment of the reflected detection pulse may then return towards topology detector 240 along a respective scan path to impinge upon a corresponding sensor 612(*a*) through 612(*e*) of topology detector 240. In the FIG. 7 embodiment, for example, a first wave segment may be detected by sensor 612(*c*) along scan path 726 after the detection pulse is reflected from target object 112 at axis 740. Similarly, a second wave segment may be detected by sensor 612(*d*) along scan path 722 after the detection pulse is reflected from target object 112 at axis 736. Likewise, a third wave segment may be detected by sensor 612(*b*) along scan path 730 after the detection pulse is reflected from target object 112 at axis 736.

In certain circumstances, little or none of the detection pulse may be reflected back to topology detector 240. For example, sensor 612(*e*) may detect no reflected wave-segment energy along scan path 718 after the detection pulse passes an infinity point marked by distance axis 714. Similarly, sensor 612(*a*) may detect no reflected wave-segment energy along scan path 734 after the detection pulse passes an infinity point marked by distance axis 714.

In accordance with the present invention, topology sensor 240 may then responsively generate respective contour values that each represent the length of a respective scan path traveled by an associated wave segment. In certain embodiments, topology detector 240 may generate contour values by measuring the time between propagation of the detection pulse by transmitter module 512 and detection of the individual reflected wave segments by respective sensors 612.

In the FIG. 7 embodiment, topology detector 240 may generate contour values that are directly proportional to the respective scan paths. For example, sensor 612(*a*) may produce a contour value equal to infinity, sensor 612(*b*) may produce a contour value equal to 3, sensor 612(*c*) may produce a contour value equal to one, sensor 612(*d*) may produce a contour value equal to three, and sensor 612(*e*) may produce a contour value equal to infinity.

Conversely, topology detector 240 may generate contour values that are inversely proportional to the respective scan paths. For example, sensor 612(*a*) may produce a contour value equal to zero, sensor 612(*b*) may produce a contour value equal to one, sensor 612(*c*) may produce a contour value equal to three, sensor 612(*d*) may produce a contour value equal to one, and sensor 612(*e*) may produce a contour value equal to zero.

In the FIG. 7 embodiment, detection manager 416 may then access the contour values, and responsively generate corresponding topology values that may be stored into memory 346. In certain embodiments, detection manager 416 may perform various processing functions on the contour values to generate topology values in a format that is compatible for use by three-dimensional simulation software to generate three-dimensional images of target object 112.

For example, detection manager 416 may interpolate values between the various contour values to thereby provide individual topology values corresponding to each pixel of an associated set of simultaneously-captured image data for target object 112. Detection manager 416 may then preferably store sets of topology values into memory 346. In one embodiment, detection manager 416 may store topology values along with corresponding image data in the same unified file. However, in other embodiments, detection manager 416 may store topology values into a separate topology data file that includes a unique image identifier to designate an associated set of image data. In the foregoing topology data file, each topology value may preferably also include a unique pixel identifier or pointer to designate an associated pixel from the corresponding image data.

Figure 8:
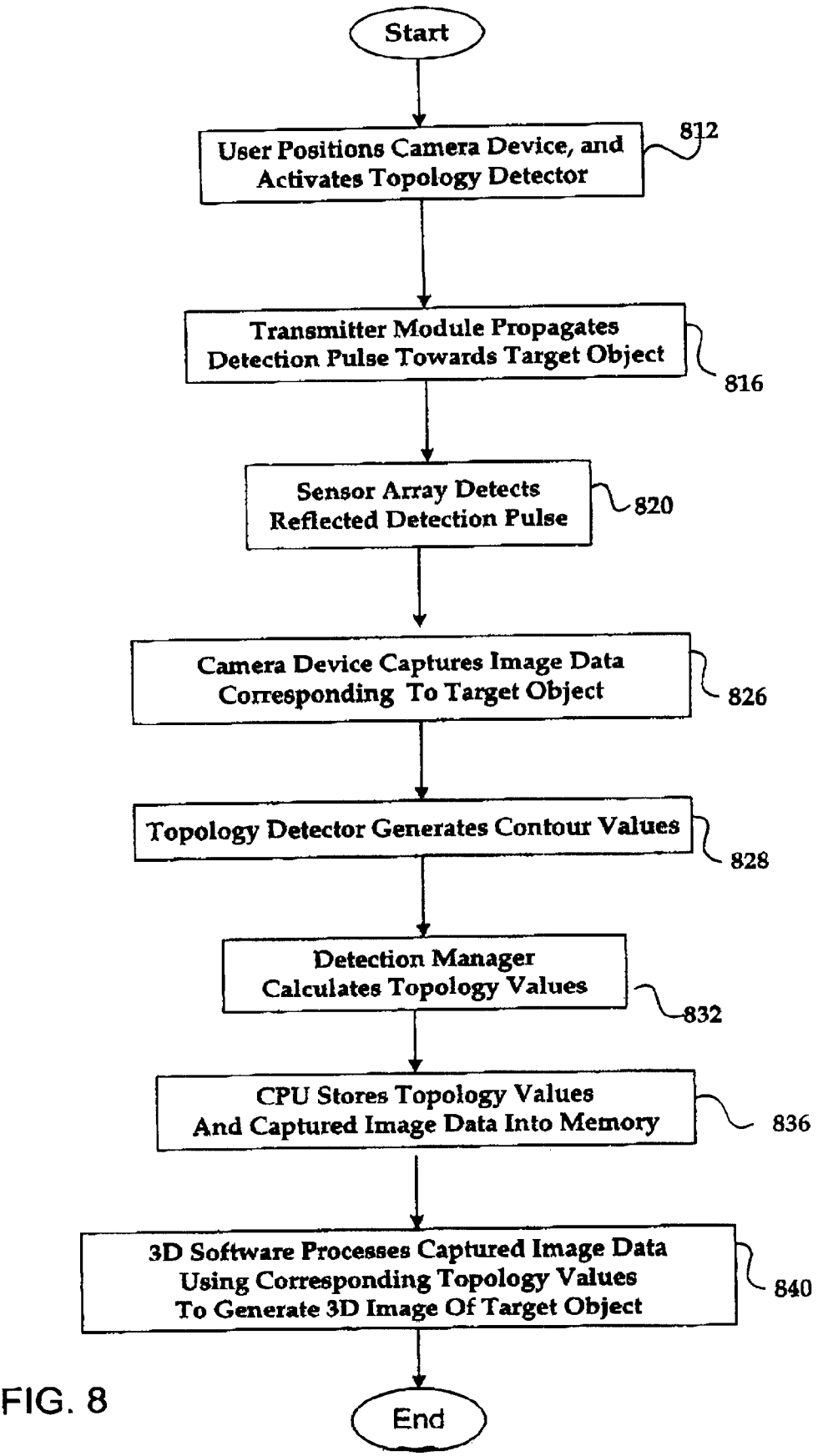
FIG. 8 is a flowchart of method steps for utilizing a topology detector to capture visual information, in accordance with one embodiment of the present invention.

Referring now to FIG. 8, a flowchart of method steps for utilizing a topology detector 240 is shown, in accordance with one embodiment of the present invention. The FIG. 8 embodiment is presented for purposes of illustration, and, in alternate embodiments, the present invention may readily utilize various other steps and sequences than those discussed in conjunction with the FIG. 8 embodiment.

In the FIG. 8 embodiment, in step 812, a system user preferably utilizes viewfinder 308 to position a camera device 110 for capturing image data corresponding to a selected target object 112, and then activates topology detector 240 using any effective technique. In the FIG. 8 embodiment, the system user may activate topology detector 240 by partially depressing a shutter activation button mounted to an external surface of camera device 110. In certain embodiments, camera device 110 may alternately be automatically positioned and topology detector 240 may be automatically activated through the use of appropriate electronic and mechanical means.

In step 816, transmitter module 512 of topology detector 240 preferably propagates a detection pulse towards the selected target object 112. As discussed above, in conjunction with FIG. 6, the propagated detection pulse may comprise any appropriate type of energy transmission or waveform. Next, in step 820, sensor array 516 of topology detector 240 preferably detects a plurality of localized wave segments from the detection pulse that is reflected back towards topology detector 240.

In step 826, camera device 110 preferably captures image data corresponding to the selected target object 112. Then, in step 828, topology detector 240 preferably generates individual contour values that each correspond to a respective reflected wave segment.

In step 832, detection manager 416 may preferably access the individual contour values generated by topology detector 240, and responsively generate corresponding topology values to define the three-dimensional shape of target object 112. In step 836, CPU 344 may preferably store the captured image data into memory 346, and in response to instructions from detection manager 416, may preferably also store the generated topology values into memory 346. Finally, in step 840, three-dimensional simulation software may preferably process the captured image data using the corresponding stored topology values to thereby generate three-dimensional images from the two-dimensional captured image data.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for capturing topology information, comprising:
   a topology detector configured to analyze a target object and generate contour values corresponding to said target object; and
   a detection manager configured to store said contour values into a memory device as said topology information.

2. The system of claim 1 wherein said topology detector and said detection manager are included in a camera device that captures image data corresponding to said target object.

3. The system of claim 1 wherein said topology detector additionally functions as an auto-focus mechanism for a camera device.

4. The system of claim 3 wherein said camera device includes a capture subsystem having said topology detector and an image sensor, and a control module having said detection manager and said memory device.

5. The system of claim 4 wherein said topology detector analyzes said target object using one of a direct path and an indirect path between said topology detector and said target object, said direct path being aligned in close proximity to an optical path between said image sensor and said target object, said indirect path being reflected onto said optical path.

6. The system of claim 4 wherein said detection manager generates said topology information by analyzing contrast information corresponding to said target object, said contrast information being captured using said image sensor.

7. The system of claim 1 wherein said topology information is utilized by three-dimensional simulation software to generate vector-based three-dimensional images.

8. The system of claim 1 wherein a transmitter module in said topology detector propagates a detection pulse towards said target object, said detection pulse being reflected back towards a sensor array in said topology detector along separate scan paths as localized wave segments that are individually detected by respective sensors in said sensor array, said sensor array responsively generating contour values that each correspond to a respective length of one of said separate scan paths, said detection manager responsively converting said contour values into corresponding topology values that are stored in said memory device, each of said topology values being associated with a respective pixel of image data that represents said target object.

9. The system of claim 1 wherein said detection manager is controlled by a central processing unit that is coupled to a control module of a digital camera device.

10. The system of claim 1 wherein said memory device includes at least one of an operating system, application software, said detection manager, sets of captured image data, and sets of topology data that each correspond to a respective one of said sets of topology data.

11. The system of claim 1 wherein said topology detector includes a transmitter module configured to propagate a detection pulse towards said target object, and a sensor array configured to detect wave segments from a reflected detection pulse.

12. The system of claim 11 wherein said sensor array includes a sensor matrix of sensors, said sensors detecting respective wave segments from said reflected detection pulse along respective scan paths, to thereby generate associated contour values that represent travel times and scan distances between said transmitter module and localized areas of said target object.

13. The system of claim 1 wherein a system user positions said topology detector to capture image data corresponding to said target object, and then activates said topology detector using an externally-mounted user interface.

14. The system of claim 13 wherein a transmitter module in said topology detector propagates a detection pulse towards said target object, said detection pulse being at least one of infrared energy, radio-frequency energy, microwave energy, sound energy, and light energy.

15. The system of claim 14 wherein said detection pulse is reflected back towards a sensor array in said topology detector, individual sensors in said sensor array detecting respective localized wave segments from said detection pulse along respective scan paths.

16. The system of claim 15 wherein said topology detector generates individual contour values that each correspond to a path length of one of said respective scan paths between said topology detector and a localized area of said target object.

17. The system of claim 16 wherein said individual contour values are one of proportional contour values and inversely-proportional contour values, said proportional contour values being proportional to said path length, and said inversely-proportional values being inversely proportional to said path length.

18. The system of claim 16 wherein said detection manager generates topology values from said individual contour values, said topology values being encoded in a format that is compatible with a three-dimensional simulation software program.

19. The system of claim 18 wherein said detection manager interpolates intervening topology values between said individual contour values to produce said topology values.

20. The system of claim 18 wherein said detection manager stores said topology values into said memory device, said topology values being stored into one of a unified storage location and a separate storage location, said unified storage location including said topology values together with said image data, said separate storage location including only said topology values, said topology values each being identified with a corresponding pixel of said image data by using a pointer mechanism.

21. A method for capturing topology information, comprising the steps of:
analyzing a target object with a topology detector to generate contour values corresponding to said target object; and
storing said contour values into a memory device as said topology information by using a detection manager.

22. The method of claim 21 wherein said topology detector and said detection manager are included in a camera device that captures image data corresponding to said target object.

23. The method of claim 21 wherein said topology detector additionally functions as an auto-focus mechanism for a camera device.

24. The method of claim 23 wherein said camera device includes a capture subsystem having said topology detector and an image sensor, and a control module having said detection manager and said memory device.

25. The method of claim 24 wherein said topology detector analyzes said target object using one of a direct path and an indirect path between said topology detector and said target object, said direct path being aligned in close proximity to an optical path between said image sensor and said target object, said indirect path being reflected onto said optical path.

26. The method of claim 24 wherein said detection manager generates said topology information by analyzing contrast information corresponding to said target object, said contrast information being captured using said image sensor.

27. The method of claim 21 wherein said topology information is utilized by three-dimensional simulation software to generate vector-based three-dimensional images.

28. The method of claim 21 wherein a transmitter module in said topology detector propagates a detection pulse towards said target object, said detection pulse being reflected back towards a sensor array in said topology detector along separate scan paths as localized wave segments that are individually detected by respective sensors in said sensor array, said sensor array responsively generating contour values that each correspond to a respective length of one of said separate scan paths, said detection manager responsively converting said contour values into corresponding topology values that are stored in said memory device, each of said topology values being associated with a respective pixel of image data that represents said target object.

29. The method of claim 21 wherein said detection manager is controlled by a central processing unit that is coupled to a control module of a digital camera device.

30. The method of claim 21 wherein said memory device includes at least one of an operating system, application software, said detection manager, sets of captured image data, and sets of topology data that each correspond to a respective one of said sets of topology data.

31. The method of claim 21 wherein said topology detector includes a transmitter module configured to propagate a detection pulse towards said target object, and a sensor array configured to detect wave segments from a reflected detection pulse.

32. The method of claim 31 wherein said sensor array includes a sensor matrix of sensors, said sensors detecting respective wave segments from said reflected detection pulse along respective scan paths, to thereby generate associated contour values that represent travel times and scan distances between said transmitter module and localized areas of said target object.

33. The method of claim 21 wherein a system user positions said topology detector to capture image data corresponding to said target object, and then activates said topology detector using an externally-mounted user interface.

34. The method of claim 33 wherein a transmitter module in said topology detector propagates a detection pulse towards said target object, said detection pulse being at least one of infrared energy, radio-frequency energy, microwave energy, sound energy, and light energy.

35. The method of claim 34 wherein said detection pulse is reflected back towards a sensor array in said topology detector, individual sensors in said sensor array detecting respective localized wave segments from said detection pulse along respective scan paths.

36. The method of claim 35 wherein said topology detector generates individual contour values that each correspond to a path length of one of said respective scan paths between said topology detector and a localized area of said target object.

37. The method of claim 36 wherein said individual contour values are one of proportional contour values and inversely-proportional contour values, said proportional contour values being proportional to said path length, and said inversely-proportional values being inversely proportional to said path length.

38. The method of claim 36 wherein said detection manager generates topology values from said individual contour values, said topology values being encoded in a format that is compatible with a three-dimensional simulation software program.

39. The method of claim 38 wherein said detection manager interpolates intervening topology values between said individual contour values to produce said topology values.

40. The method of claim 38 wherein said detection manager stores said topology values into said memory device, said topology values being stored into one of a unified storage location and a separate storage location, said unified storage location including said topology values together with said image data, said separate storage location including only said topology values, said topology values each being identified with a corresponding pixel of said image data by using a pointer mechanism.

41. The method of claim 21 further comprising the steps of:
capturing image data simultaneously with said step of analyzing, said image data corresponding to said target object,
storing said image data into said memory device, and
mapping each of said contour values to a corresponding pixel of said image data using three-dimensional software to thereby generate three-dimensional images of said target object.

42. A computer-readable medium comprising program instructions for capturing visual information by performing the steps of:
analyzing a target object with a topology detector to generate contour values corresponding to said target object; and
storing said contour values into a memory device as said topology information by using a detection manager.

43. A system for capturing topology information, comprising:
means for analyzing a target object to generate contour values corresponding to said target object; and
means for storing said contour values into a memory device as said topology information.

\* \* \* \* \*